Patented Aug. 29, 1944

2,357,103

UNITED STATES PATENT OFFICE 2,357,103

PREPARATION OF PYROGEN-FREE UROGASTRONE

John S. Gray, San Antonio, Tex., assignor to Merck & Co., Inc., Rahway, N. J., a corporation of New Jersey No Drawing. Application August 4, 1942, Serial No. 453,605

10 Claims. (Cl. 260—236.5)

This invention relates to the preparation of pyrogen-free urogastrone.

One object of the invention comprises, inter alia, a new and improved procedure for the preparation of urogastrone products.

Urogastrone is obtainable from urine and effectively inhibits gastric secretion. Crude urogastrone concentrates have been procured from urine. The procedure in accordance with my invention contemplates the further purification of such concentrates.

The crude urogastrone product that may be used in accordance with my invention may be, for instance, one obtained by the benzoic acid adsorption method. This method is, for instance, illustrated in the following Example I.

Example I

The urine is collected in 5-gallon bottles containing sufficient preservative to maintain sterility when the bottle has become filled. In the case of tricresol a concentration of 0.25 per cent is used; with phenol, a concentration of 0.5 per cent is used; with toluene, enough is used to cover the surface. If the latter preservative has been used, the urine without stirring is siphoned off to separate it from the toluene, which would otherwise interfere with the process of extraction. The urine is made faintly acid to Congo red paper with glacial acetic acid. With continuous stirring, 50 cc. of a saturated acetone solution of benzoic acid are added per liter of urine. After an additional ten minutes of stirring, the mixture is allowed to stand overnight in the cold. The next morning the clear supernatant is siphoned off and discarded and the precipitate is collected on large suction filters. The precipitate is resuspended in a quantity of saturated aqueous solution of benzoic acid equal to $\frac{1}{10}$ of the original volume of urine. The mixture is re-filtered by suction and allowed to remain on the filter for several hours in order to remove as much water as possible. If necessary, the material in this form may be stored in the cold for several days. The precipitate is then mixed with acetone in an amount equal to $\frac{1}{20}$ of the original volume of urine and 0.5 cc. of 5 per cent sodium chloride is added per liter of urine. On either a volume or weight basis the added acetone should contribute at least 80 per cent to the final mixture; if this is not the case, more acetone should be added. After standing for several hours the clear brown supernatant is siphoned off and discarded and the precipitate is collected by centrifuging. The precipitate is washed thoroughly with acetone and ether and dried.

The yield of the procedure outlined in Example I is usually such that one gram of the extracted product represents from 12 to 15 liters of urine. The obtained crude urogastrone product is a grey-tan powder substantially insoluble in water unless distinctly alkaline. The same appears to consist primarily of a mucoid type of protein, yields reducing substances on hydrolysis, is substantially insoluble in 70% alcohol, but is not precipitated by trichloracetic acid.

In the practical application of my invention, the crude urogastrone product as for instance obtained in Example I is extracted with acidified acetone and preferably an acetone of at least 70% acetone concentration. The extraction is preferably carried out by repeatedly contacting the crude product or the residue as the case may be with the acetone. As a general rule, however, a two-step reaction will suffice. The acetone extract solutions, suitably separated from residues, are then admixed with alcohol, acetone and a relatively small amount of aniline. For best results, I prefer to use approximately $\frac{1}{10}$ volume of alcohol, $\frac{1}{10}$ volume of aniline and 3 volumes of acetone.

The purification procedure in accordance with my invention is, for instance, exemplified by the following Example II.

Example II

One gram of crude concentrate is thoroughly shaken with 15 cc. of 70 per cent acetone containing 1 cc. of concentrated HCl per 100 cc. The mixture is centrifuged and the residue is re-extracted with another 15 cc. portion of the acetone mixture. From the combined supernatant extracts the active material is precipitated by the addition of one volume of ethyl alcohol, containing 3 cc. of aniline, and three volumes of acetone. The flocculent precipitate is collected by centrifuging and washed with acetone and ether and dried.

The product obtained in Example II constitutes a tan powder not very soluble in water because it is at its isoelectric point. The addition of acid or alkali makes it very soluble. The yield by weight from the crude product from which it was obtained is about 10%. The product is physiologically active in 5 mgm. doses representing 600 to 800 cc. of urine.

Within the purview of my invention and as a further embodiment thereof I have discovered that this purified urogastrone product may be still further purified by preparing an acidified aqueous solution thereof and adding to such aqueous solution acetone, preferably in amount sufficient to establish an acetone concentration of at least 80%, and a small amount of aniline or pyridine until a precipitate is formed. As a rule the addition of pyridine is somewhat more effective than that of aniline in this procedure. The supernatant is separated, dried, and an acidified concentrated methanol solution thereof is prepared. N. butyl alcohol, acetone, and a small amount of aniline are added to such solution until a precipitate forms, and the precipitate, containing urogastrone, is recovered. The resulting product is of greater purity and of higher physiological activity. Such purification procedure is, for instance, exemplified in the following Example III.

*Example III*

One gram of the product purified in accordance with the preceding example is dissolved in 10 cc. of distilled water with the aid of 0.2 cc. of concentrated HCl. The addition of 20 cc. of acetone aids the process of solution. The further slow addition of 20 cc. of acetone, which raises the acetone concentration to 80 per cent, brings down a gummy precipitate. The addition of 0.5 cc. of pyridine increases the precipitate and converts it to a tarry material. The mixture is centrifuged and the light-colored supernatant is separated. The residue is subjected to the same extraction procedure three times more. The combined supernatant extracts are then distilled to dryness to vacuo at a temperature below 55° C.

The dried residue is taken up in the least quantity of methyl alcohol acidified with 1 cc. of concentrated HCl per 100 cc. The methyl alcohol solution is centrifuged to remove a small amount of insoluble material, which in turn is washed with the least quantity of acid methyl alcohol. The original methyl alcohol solution and the washings are combined. The active material is precipitated from this solution by the addition of one volume of normal butyl alcohol, containing 2 cc. of aniline, and three volumes of acetone. The flocculent percipitate is washed with acidified acetone to convert it into the chloride, then with ether, and dried.

The thus purified product constitutes a tan powder substantially soluble in water. The yield by weight is in the neighborhood of 10%; the yield of activity is nearly quantitative. The product is physiologically active in doses of from 0.25 to 0.5 mgms.

Within the scope of my invention and as a still further embodiment thereof, I have discovered that a urogastrone product of an even higher degree of purification and physiological activity can be obtained by preparing an acidified aqueous solution of a crude urogastrone product preferably preliminarily purified, adding to such solution acetone and a small amount of pyridine, preparing a concentrated methanol solution of the precipitate, precipitating a urogastrone product from such methanol solution and repeating the procedure except that in the precipitation from the acidified aqueous solution aniline is substituted for the pyridine. The precipitation from the methanol solutions are preferably so carried out that in the first methanol solution the urogastrone product is precipitated by n. butyl alcohol and a small amount of aniline whereas the preferred procedure for the precipitation from the second methanol solution is that of adding acetone. A procedure illustrating this embodiment in accordance with my invention is, for instance, exemplified in the following Example IV.

*Example IV*

50 mg. of the material obtained in Example III is dissolved in 4 cc. of water and 21 cc. of acetone are added slowly and with stirring to bring the concentration of acetone to 84%. The addition of 1 cc. of aniline produces a precipitate which is separated by centrifuging. The supernatant fluid is reduced to dryness in vacuo at 55° C. and the resulting residue is taken up in 1 cc. of methyl alcohol containing 1 cc. of concentrated HCl per 100 cc. The active material is precipitated from this solution by the addition of 10 volumes of acetone. The precipitate is washed with slightly acidified acetone and ether and dried.

The product obtaianed in accordance with the last mentioned example is in appearance and chemical behavior similar to the material from which it is prepared. However, it is physiologically more active, being active in a dose of 0.2 mg.

Although the various purification procedures herein set forth may be individually applied to the purification of crude urogastrone products, I prefer to use the same in the order herein mentioned.

The purification procedure described herein yields a pyrogen-free urogastrone. Pyrogen is a substance which has been found to be primarily of bacterial origin, and which causes a febrile reaction in assay animals.

Modifications may be made in carrying out the present invention without departing from the spirit and scope thereof, and I am to be limited only by the appended claim.

I claim:

1. In a process for the purification of urogastrone, the steps comprising treating an acidified aqueous acetone extract solution of crude urogastrone with alcohol, acetone and aniline, and recovering urogastrone from the precipitate formed.

2. In a process for the purification of urogastrone, the steps comprising treating an acidified aqueous, at least 70% acetone-containing, extract solution of crude urogastrone with substantially 1/10 volume of alcohol, 1/10 volume of aniline and three volumes of acetone, and recovering urogastrone from the precipitate formed.

3. In a process for the purification of urogastrone, the steps comprising treating an acidified aqueous acetone extract solution of crude urogastrone with alcohol, acetone and aniline to obtain a precipitate, treating an acidified aqueous solution of such precipitate with acetone and a small amount of a substance selected from the group consisting of aniline and pyridine to form a precipitate, and separating the urogastrone-containing supernatant liquor.

4. In a process for the purification of urogastrone, the steps comprising treating an acidified aqueous acetone extract solution of crude urogastrone with alcohol, acetone and aniline to obtain a precipitate, treating an acidified aqueous solution of such precipitate with acetone and a small amount of a substance selected from the group consisting of aniline and pyridine to form a precipitate, separating the urogastrone-containing supernatant liquor, and drying the same.

5. In a process for the purification of urogastrone, the steps comprising treating an acidified aqueous acetone extract solution of crude urogastrone with alcohol, acetone and aniline to obtain a precipitate, treating an acidified aqueous solution of such precipitate with acetone, in amount sufficient to establish an acetone concentration of at least 80%, and a small amount of a substance selected from the group consisting of aniline and pyridine to form a precipitate, and separating the urogastrone-containing supernatant liquor.

6. In a process for the purification of urogastrone, the steps comprising treating an acidified aqueous acetone extract solution of crude urogastrone with alcohol, acetone and aniline to obtain a precipitate, treating an acidified aqueous solution of such precipitate with acetone and a small amount of a substance selected from the group consisting of aniline and pyridine to form a precipitate, separating the urogastrone-containing supernatant liquor, drying, treating an acidified concentrated methanol solution thereof with n. butyl alcohol, acetone and a small amount of aniline until a precipitate is formed, and recovering urogastrone from the last mentioned precipitate.

7. In a process for the purification of urogastrone, the steps comprising treating an acidified aqueous acetone extract solution of crude urogastrone with alcohol, acetone and aniline to obtain a precipitate, treating an acidified aqueous solution of such precipitate with acetone and a small amount of pyridine to form a precipitate, separating the urogastrone-containing supernatant liquor, drying, treating an acidified concentrated methanol solution thereof with n. butyl alcohol, acetone and a small amount of aniline to obtain a precipitate, treating an acidified aqueous solution of the last mentioned precipitate with acetone and a small amount of aniline until a precipitate is formed, separating the urogastrone-containing supernatant liquor, drying, treating an acidified concentrated methanol solution thereof with acetone to form a precipitate, and recovering urogastrone from the precipitate.

8. In a process for the purification of urogastrone, the steps comprising treating an acidified aqueous solution of crude urogastrone with an amount of acetone sufficient to establish an acetone concentration of at least 80%, and a small amount of a substance selected from the group consisting of aniline and pyridine to form a precipitate, and recovering the urogastrone-containing supernatant liquor.

9. In a process for the purification of urogastrone, the steps comprising treating an acidified concentrated methanol solution of crude urogastrone with n. butyl alcohol, acetone and a small amount of aniline to form a precipitate, and recovering urogastrone from the precipitate.

10. In a process for the purification of urogastrone, the steps comprising treating an acidified concentrated methanol solution of crude urogastrone with acetone to form a precipitate, and recovering urogastrone from the precipitate.

JOHN S. GRAY.